US009648112B2

(12) United States Patent
Chung

(10) Patent No.: US 9,648,112 B2
(45) Date of Patent: May 9, 2017

(54) ELECTRONIC DEVICE AND METHOD FOR SETTING NETWORK MODEL

(71) Applicant: Chiun Mai Communication Systems, Inc., New Taipei (TW)

(72) Inventor: Kai-Wen Chung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 41 days.

(21) Appl. No.: 14/688,478

(22) Filed: Apr. 16, 2015

(65) Prior Publication Data

US 2016/0127194 A1    May 5, 2016

(30) Foreign Application Priority Data

Nov. 4, 2014    (CN) .......................... 2014 1 0614723

(51) Int. Cl.
*H04W 4/00* (2009.01)
*H04L 29/08* (2006.01)
*H04W 8/22* (2009.01)
*H04W 76/02* (2009.01)
*H04W 8/18* (2009.01)
*H04W 88/02* (2009.01)

(52) U.S. Cl.
CPC ............... *H04L 67/18* (2013.01); *H04W 8/22* (2013.01); *H04W 8/18* (2013.01); *H04W 76/027* (2013.01); *H04W 88/02* (2013.01)

(58) Field of Classification Search
CPC .............................. H04L 41/45; H04L 65/105
USPC ....................................... 455/422.1; 709/231
See application file for complete search history.

(56) References Cited

U.S. PATENT DOCUMENTS 7,568,041 B1 *   7/2009  Turner .................. H04L 65/105
                                                            709/231
2016/0127194 A1 *   5/2016  Chung .................. H04L 41/145
                                                            455/422.1

* cited by examiner

*Primary Examiner* — William D Cumming
(74) *Attorney, Agent, or Firm* — Steven Reiss

(57) ABSTRACT

A method for setting network models of an electronic device includes setting a default network model list comprising a plurality of default network models for the electronic device and setting a sequence of the plurality of default network models. A specified network model that is used to connect the electronic device to a telecom company is searched from the default network model list according to the sequence. A code of the telecom company is acquired and a country where the telecom company is located is determined according to the acquired code. A network model list corresponding to the determined country is acquired from a database which stores a network model list corresponding to each predetermined country. The default network model list is updated to be the acquired network model list corresponding to the determined country.

6 Claims, 3 Drawing Sheets

ELECTRONIC DEVICE AND METHOD FOR SETTING NETWORK MODEL

CROSS-REFERENCE TO RELATED APPLICATIONS

This application claims priority to Chinese Patent Application No. 201410614723.0 filed on Nov. 4, 2014, the contents of which are incorporated by reference herein.

FIELD

The subject matter herein generally relates to network technology, and particularly to setting network models of an electronic device.

BACKGROUND

When a user of an electronic device desires to set network models of the electronic device, the user should know types of network models provided by a country where he is located. Then the user has to set the network models of the electronic device manually.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
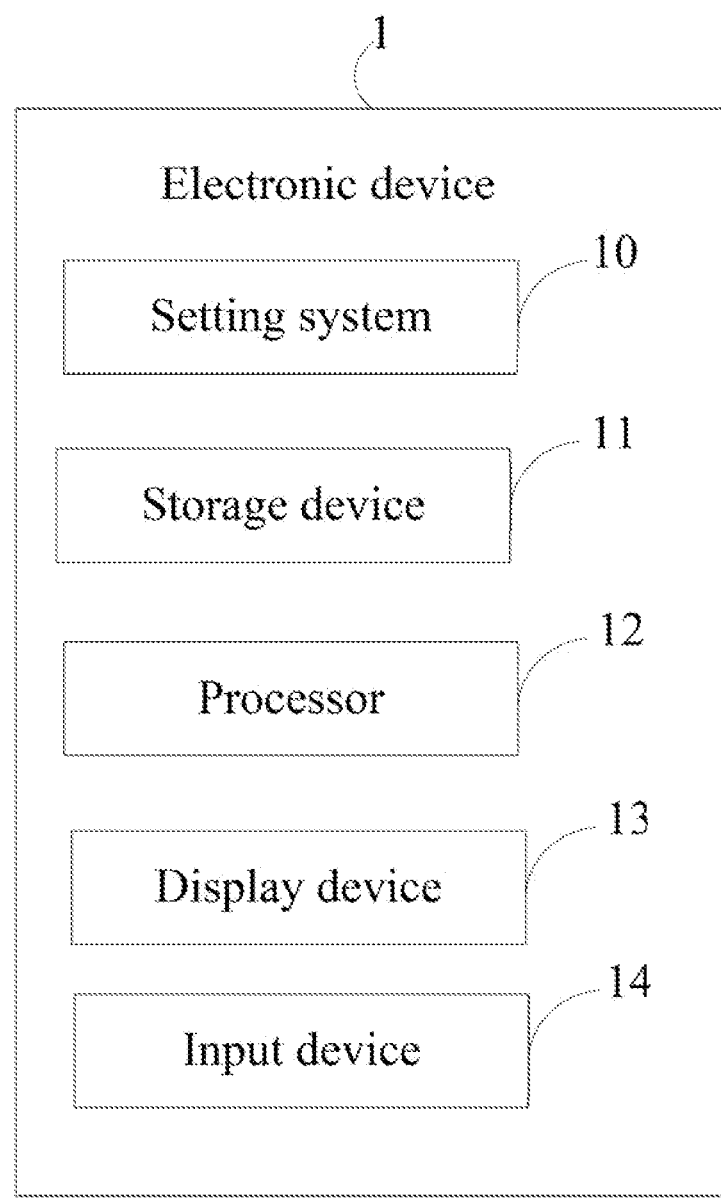
FIG. 1 is a block diagram of one embodiment of an electronic device including a setting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation.

Several definitions that apply throughout this disclosure will now be presented. It should be noted that references to "an" or "one" embodiment in this disclosure are not necessarily to the same embodiment, and such references mean "at least one." Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of one embodiment of an electronic device. In at least one embodiment as shown in FIG. 1, an electronic device 1 includes, but is not limited to, a setting system 10, a storage device 11, at least one processor 12, a display device 13, and an input device 14. The electronic device 1 can be a tablet computer, a notebook computer, a smart phone, a personal digital assistant (PDA), or another suitable electronic device. FIG. 1 illustrates only one example of the electronic device that can include more or fewer components than illustrated, or have a different configuration of the various components in other embodiments.

The setting system 10 can automatically set network models of the electronic device 1 according to a country location of a user of the electronic device 1. Thus, when the user is in a foreign country, there is no need for the user to know what network models are used in the foreign country.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 12 can be a central processing unit (CPU), a microprocessor, or other data processor chip that performs functions of the setting system 10 in the electronic device 1. The display device 13 can display images and videos, and the input device 14 can be a mouse, a keyboard, or a touch panel.

Figure 2:
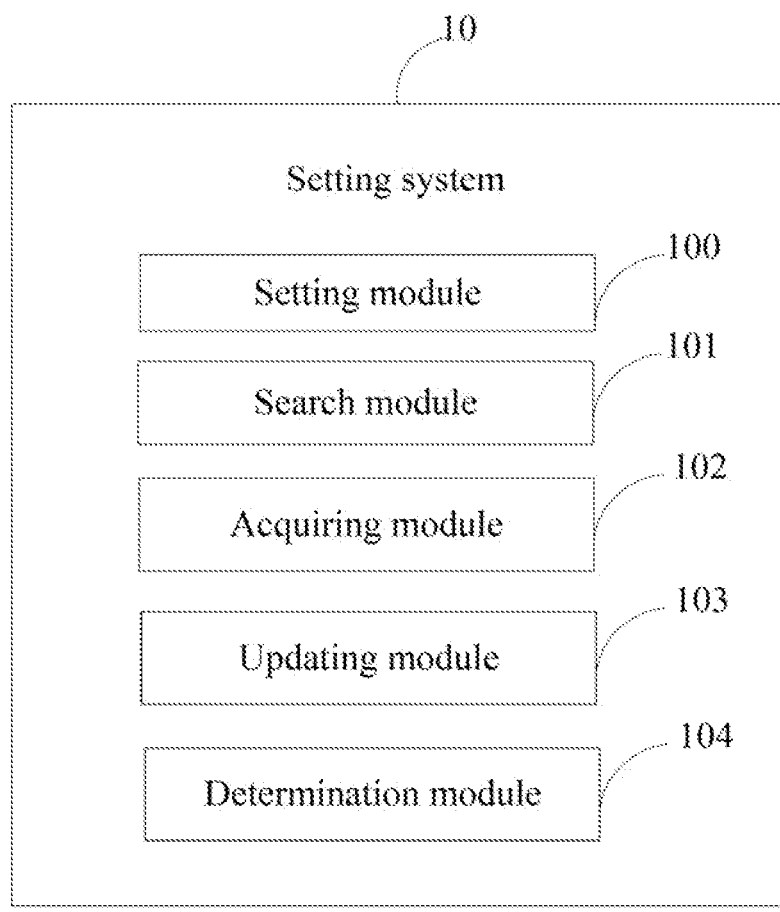
FIG. 2 is a block diagram of one embodiment of function modules of the setting system in the electronic device of FIG. 1.

FIG. 2 is a block view of one embodiment of function modules of the setting system. In at least one embodiment, the setting system 10 can include a setting module 100, a search module 101, an acquiring module 102, an updating module 103 and a determination module 104. The function modules 100, 101, 102, 103 and 104 can include computerized codes in the form of one or more programs, which are stored in the storage device 11. The at least one processor 12 executes the computerized codes to provide functions of the function modules 100-104.

When the user selects an option provided by the setting module 100 to make the setting system 10 set network models of the electronic device 1 automatically, the setting module 100 sets a default network model list for the electronic device 1. The default network model list includes a plurality of default network models. The setting module 100 can set and change a sequence of the plurality of default network models.

In at least one embodiment, the default network model list includes, but is not limited to, a fourth generation of mobile telecommunications technology (4G) network model, a third generation of mobile telecommunications technology (3G) network model and a second generation of mobile telecommunications technology (2G) network model. Depending on this embodiment, the sequence of the plurality of default network models can be the 4G network model, the 3G network model, and the 2G network model.

According to the sequence, the search module 101 searches a specified network model from the default network model list. The specified network model is used to connect the electronic device 1 to a telecom company successfully.

In at least one embodiment, the search module 101 searches the 4G network model first. If the 4G network model can be used to connect the electronic device 1 to the telecom company successfully, the search module 101 determines the 4G network model to be the specified network model. If the 4G network model cannot be used to connect the electronic device 1 to the telecom company successfully, the search module 101 searches the 3G network model. If the 3G network model can be used to connect the electronic device 1 to the telecom company successfully, the search module 101 determines the 3G network model to be the specified network model. If the 3G network model cannot be used to connect the electronic device 1 to the telecom company successfully, the search module 101 searches the 2G network model. If the 2G network model can be used to connect the electronic device 1 to the telecom company successfully, the search module 101 determines the 2G network model to be the specified network model. If the 2G network model cannot be used to connect the electronic device 1 to the telecom company successfully, the search module 101 returns to search the 4G network model.

The acquiring module 102 acquires a code of the telecom company. In at least one embodiment, the acquired code includes a country code, which can be used to determine a country where the telecom company is located. The acquiring module 102 acquires the country code from the acquired code. According to the country code, the acquiring module 102 determines the country where the telecom company is located.

The storage device 11 pre-stores a database which stores a network model list corresponding to each predetermined country. The acquiring module 102 acquires a network model list corresponding to the determined country from the database.

The updating module 103 updates the default network model list to be the acquired network model list corresponding to the determined country.

The determination module 104 determines whether the electronic device 1 is connected to a network (e.g., Internet) within a preset time interval using the acquired network model list.

In at least one embodiment, when the electronic device 1 fails to connect to the network using the acquired network model list, the determination module 104 determines a duration within which the electronic device 1 tries connecting to the network. The determination module 104 determines whether the duration is longer than a preset duration. In at least one embodiment, when the duration is longer than the preset duration, it is represented that the user may have been in another country, and network models of the electronic device 1 in the acquired network model list need to be reset. The determination module 104 resets the default network model list including the plurality of default network models for the electronic device 1 and resets the sequence of the plurality of default network models.

In at least one embodiment, when the electronic device 1 is connected to a network within the preset time interval using the acquired network model list, or when the duration is not longer than the preset duration, it is represented that the network modules has succeeded to set the electronic device 1, thus, the electronic device 1 can be connected to the network automatically.

Figure 3:
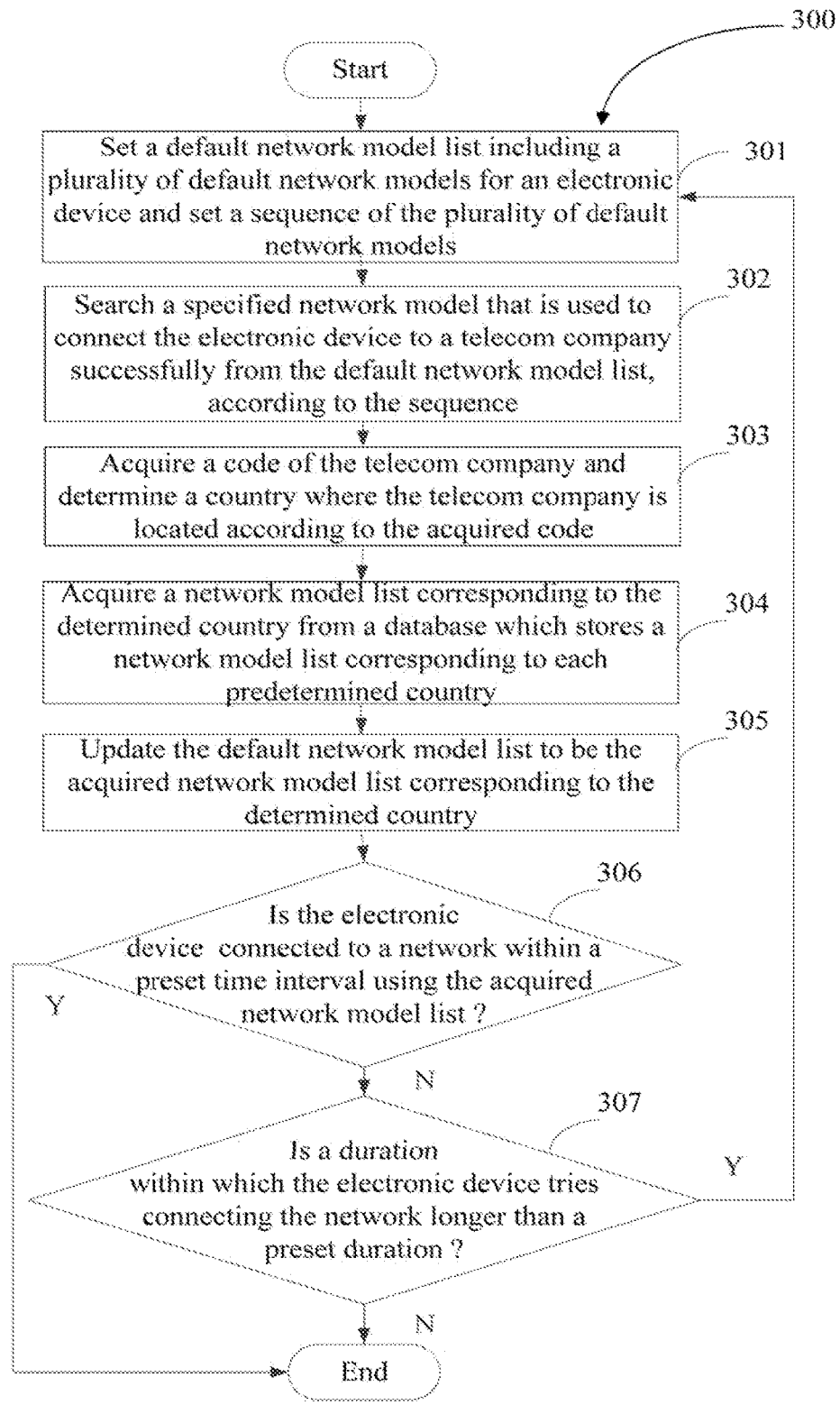
FIG. 3 illustrates a flowchart of one embodiment of a method for setting network models in the electronic device of FIG. 1.

FIG. 3 illustrates a flowchart is presented in accordance with an example embodiment. An example method 300 is provided by way of example, as there are a variety of ways to carry out the method. The example method 300 described below can be carried out using the configurations illustrated in FIGS. 1 and 2 for example, and various elements of these figures are referenced in explaining example method 300. Each block shown in FIG. 3 represents one or more processes, methods, or subroutines carried out in the example method 300. Furthermore, the illustrated order of blocks is illustrative only and the order of the blocks can be changed according to the present disclosure. The example method 300 can begin at block 301. Depending on the embodiment, additional blocks may be utilized and the ordering of the blocks can be changed.

At block 301, when the user selects an option provided by a setting module to make a setting system set network models of an electronic device automatically, the setting module sets a default network model list for the electronic device. The default network model list includes a plurality of default network models. The setting module can set and change a sequence of the plurality of default network models.

In at least one embodiment, the default network model list includes, but is not limited to, a fourth generation of mobile telecommunications technology (4G) network model, a third generation of mobile telecommunications technology (3G) network model and a second generation of mobile telecommunications technology (2G) network model. Depending on this embodiment, the sequence of the plurality of default network models can be the 4G network model, the 3G network model, and the 2G network model.

At block 302, According to the sequence, a search module searches a specified network model from the default network model list. The specified network model is used to connect the electronic device to a telecom company successfully.

In at least one embodiment, the search module firstly searches the 4G network model. If the 4G network model can be used to connect the electronic device to the telecom company successfully, the search module determines the 4G network model to be the specified network model. If the 4G network model cannot be used to connect the electronic device to the telecom company successfully, the search module searches the 3G network model. If the 3G network model can be used to connect the electronic device to the telecom company successfully, the search module determines the 3G network model to be the specified network model. If the 3G network model cannot be used to connect the electronic device to the telecom company successfully, the search module searches the 2G network model. If the 2G network model can be used to connect the electronic device to the telecom company successfully, the search module determines the 2G network model to be the specified network model. If the 2G network model cannot be used to connect the electronic device to the telecom company successfully, the search module returns to search the 4G network model.

At block 303, an acquiring module acquires a code of the telecom company. In at least one embodiment, the acquired code includes a country code, which can be used to determine a country where the telecom company is located. The acquiring module acquires the country code from the acquired code. According to the country code, the acquiring module 102 determines the country where the telecom company is located.

At block 304, a storage device of the electronic device pre-stores a database which stores a network model list corresponding to each predetermined country. The acquiring module acquires a network model list corresponding to the determined country from the database.

At block 305, an updating module updates the default network model list to be the acquired network model list corresponding to the determined country.

At block 306, a determination module determines whether the electronic device is connected to a network (e.g., Internet) within a preset time interval using the acquired network model list.

At block 307, in at least one embodiment, when the electronic device fails to connect to the network using the acquired network model list, the determination module determines a duration within which the electronic device tries connecting to the network. The determination module determines whether the duration is longer than a preset duration. In at least one embodiment, when the duration is longer than the preset duration, it is represented that the user may have been in another country, and network models of the electronic device in the acquired network model list need to be reset, a procedure returns to the block 301.

In at least one embodiment, when the electronic device is connected to a network within the preset time interval using the acquired network model list, or when the duration is not longer than the preset duration, it is represented that the network modules has succeed to set the electronic device, the procedure ends.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for setting network models of an electronic device being executed by a processor of the electronic device, the method comprising:
   setting a default network model list comprising a plurality of default network models for the electronic device and setting a sequence of the plurality of default network models;
   searching a specified network model that is used to connect the electronic device to a telecom company successfully from the default network model list, according to the sequence;
   acquiring a code of the telecom company and determining a country where the telecom company is located according to the acquired code;
   acquiring a network model list corresponding to the determined country from a database which stores a network model list corresponding to each predetermined country; and
   updating the default network model list to be the acquired network model list corresponding to the determined country;
   determining whether the electronic device is connected to a network within a preset time interval using the acquired network model list;
   determining a duration within which the electronic device tries connecting the network, and determining whether the duration is longer than a preset duration under the condition that the electronic device fails to connect the network after the duration; and
   returning to set the default network model list comprising the plurality of default network models for the electronic device and setting the sequence of the plurality of default network models when the duration is longer than the preset duration.

2. The method according to claim 1, wherein the default network model list comprises a fourth generation of mobile telecommunications technology network model (4G), a third generation of mobile telecommunications technology (3G) network model and a second generation of mobile telecommunications technology (2G) network model, the sequence of the plurality of default network models is the 4G network model, the 3G network model and the 2G network model.

3. An electronic device, comprising:
   at least one processor; and
   a storage device that stores one or more programs which, when executed by the at least one processor, cause the at least one processor to:
   set a default network model list comprising a plurality of default network models for the electronic device and set a sequence of the plurality of default network models;
   search a specified network model that is used to connect the electronic device to a telecom company successfully from the default network model list, according to the sequence;
   acquire a code of the telecom company and determine a country where the telecom company is located according to the acquired code;
   acquire a network model list corresponding to the determined country from a database which stores a network model list corresponding to each predetermined country; and
   update the default network model list to be the acquired network model list corresponding to the determined country;
   determines whether the electronic device is connected to a network within a preset time interval using the acquired network model list;
   determines a duration within which the electronic device tries connecting the network, and determines whether the duration is longer than a preset duration under the condition that the electronic device fails to connect the network after the duration; and
   returns to set the default network model list comprising the plurality of default network models for the electronic device and sets the sequence of the plurality of default network models when the duration is longer than the preset duration.

4. The electronic device according to claim 3, wherein the default network model list comprises a fourth generation of mobile telecommunications technology network model (4G), a third generation of mobile telecommunications technology (3G) network model and a second generation of mobile telecommunications technology (2G) network model, the sequence of the plurality of default network models is the 4G network model, the 3G network model and the 2G network model.

5. A non-transitory storage medium having stored thereon instructions that, when executed by a processor of an electronic device, causes the processor to perform a control method, wherein the method comprises:

setting a default network model list comprising a plurality of default network models for the electronic device and setting a sequence of the plurality of default network models;

searching a specified network model that is used to connect the electronic device to a telecom company successfully from the default network model list, according to the sequence;

acquiring a code of the telecom company and determining a country where the telecom company is located according to the acquired code;

acquiring a network model list corresponding to the determined country from a database which stores a network model list corresponding to each predetermined country; and updating the default network model list to be the acquired network model list corresponding to the determined country;

determining whether the electronic device is connected to a network within a preset time interval using the acquired network model list;

determining a duration within which the electronic device tries connecting the network, and determining whether the duration is longer than a preset duration under the condition that the electronic device fails to connect the network after the duration; and returning to set the default network model list comprising the plurality of default network models for the electronic device and setting the sequence of the plurality of default network models when the duration is longer than the preset duration.

6. The non-transitory storage medium according to claim 5, wherein the default network model list comprises a fourth generation of mobile telecommunications technology network model (4G), a third generation of mobile telecommunications technology (3G) network model and a second generation of mobile telecommunications technology (2G) network model, the sequence of the plurality of default network models is the 4G network model, the 3G network model and the 2G network model.

* * * * *